3,308,124
PROCESS FOR PREPARING 1,1'-ALKYLENE-2,2'-BIPYRIDYLIUM DIHALIDES
John Theodore Braunholtz and Charles Shepherd, Bracknell, England, assignors to Imperial Chemical Industries Limited, London, England, a corporation of Great Britain
No Drawing. Filed June 1, 1964, Ser. No. 371,771
Claims priority, application Great Britain, June 5, 1963, 22,319/63
10 Claims. (Cl. 260—250)

This invention relates to the manufacture of herbicidal compounds, and more particularly to the manufacture of 1,1'-alkylene-2,2'-bipyridylium dihalides.

The manufacture of herbicidal bis-quaternary dihalides by interaction of ethylene dibromide with 2,2'-bipyridyl is known. Ethylene dichloride is less reactive, and usually requires an elevated pressure and temperature to make it react with 2,2'-bipyridyl at a speed adequate for commercial purposes, and under these conditions the reaction mixture is inconveniently corrosive. Consequently, although the expense of the bromide content of the bipyridylium dihalide (which does not itself contribute to the herbicidal effect of the product) can be avoided by use of the dichloride, the manufacture of the dichloride has not been regarded hitherto as an attractive commercial proposition.

We have now found that the formation of 1,1'-alkylene-2,2'-bipyridylium dihalides can be achieved very simply, without the necessity for the use of elevated pressure, by treating the 2,2'-bipyridyl with a mixture of a halogen and a 1-alkene. Suitable halogens are chlorine and bromine although the former is preferred.

Various alkenes may be used either singly or in the form of mixtures particularly those containing from 2 to 10 carbon atoms. The preferred alkene is ethylene in which case the reaction product will be a 1,1'-ethylene-2,2'-bipyridylium dihalide. When the reaction is carried out with alkenes containing more than two carbon atoms, substituted-2,2'-bipyridylium dihalides are formed, the most important members of which have the general formula

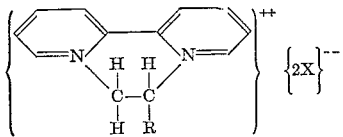

wherein R is an alkyl group and X is an atom of halogen.

We prefer to carry out the process using 2,2-bipyridyl dissolved in a solvent which is preferably resistant to reaction with the halogen and boils at a temperature which is high enough to cause the reaction to proceed rapidly. The choice of solvent is also dependent on whether it is desired to maintain the reaction product in solution or for it to be deposited from the reaction mixture as it is formed. Suitable solvents can be either polar or non-polar and include water, alcohols, ethers, hydrocarbons and chlorinated hydrocarbons. The alkene used to form the dihalide may itself constitute the solvent. Especially good results have been obtained using a nitrohydrocarbon, for example nitrobenzene (B.P. 211° C.). The amount of solvent which may be used can also vary greatly. For most purposes, however, the ratios by weight of bipyridyl to solvent can vary from 1:2 to 1:5. The reaction can also be carried out in the absence of a solvent using either solid or molten bipyridyl. In general however the solid material reacts slowly and a large proportion of the bipyridyl may be converted into other substances which have less herbicidal activity.

The invention may be carried out at either ambient or elevated temperatures although the latter are preferred. Very good results have been obtained at 80–160° C. Higher temperatures may also be used if desired, but the advantages of our process over that using an alkene dihalide are then rather less. The main advantage of our process lies in the fact that the halogen and the alkene together can react readily with 2,2'-bipyridyl at temperatures and pressures at which the alkene dihalide is substantially unreactive. Thus ethylene dichloride at 100° C. and at atmospheric pressure reacts to a negligible extent whereas operation of our process can result in a 60% or greater yield at that temperature and pressure.

The reaction is assisted considerably by the presence of a catalyst for example sodium chloride, glass wool and silica gel, the quantity of which can vary. However, very good results have been obtained when 10 to 20% by weight of the catalyst, based on the weight of the bipyridyl, is present.

The relative proportions of the halogen and the alkene used may also be varied although in general the two reactants should be in approximately equimolecular proportions. Excess of either may be used although on economic grounds this may be undesirable since this usually necessitates recovery of the component in excess. An excess of halogen is also undesirable if the solvent is reactive towards the halogen. At higher temperatures halogenation of certain solvents is especially likely to occur and this can be very undesirable since any hydrogen halide formed may cause loss and wastage of the bipyridyl by converting it into its hydrohalide which has little value as a herbicide. As a halogen and an alkene may react rapidly with each other when in contact for an extended period we prefer to add them separately to the bipyridyl. An especially satisfactory method of using halogen and the alkene is to mix vapours of the two immediately before use and to pass the mixed vapour into the solution of the bipyridyl which is thoroughly agitated during the process. The process is continued until at least a major part is converted into its bis-quaternary salt.

As the reaction proceeds it becomes slower and the tendency increases for side reactions to occur with consequent loss of bipyridyl as hydrohalide. We prefer therefore to operate our process by adding a halogen and an alkene to a solution of bipyridyl in an organic solvent, for example nitrobenzene (B.P. 211° C.), which is not only inert to chlorine under the reaction conditions but in which the bipyridylium salt is sparingly soluble. This addition is continued so long as the rate of formation of the bis-quaternary salt is high (usually until about 50% of the bipyridyl has been converted to bis-pyridylium quaternary salt) and the solid bis-quaternary salt which precipitates is removed as it is formed. The residual liquors or solution can then be used again by addition of more bipyridyl and further treatment with the halogen and the alkene. This procedure can be repeated until the accumulation of impurities in the solvent reaches a level at which purging or replacement becomes necessary. The reaction can be carried out in ordinary or ultra-violet light, preferably in the former.

The invention is illustrated by the following examples.

Example 1

A solution of 3.12 g. 2,2'-bipyridyl in 15 cc. nitrobenzene containing 0.5 g. of suspended sodium chloride, was stirred at 100° C. while a mixture of approximately equal parts by volume of chlorine and ethylene was passed into it for 1½ hours. Approximately 10 times the theoretical requirements of the gases were passed (a total of 10 litres). The gases were mixed immediately before entering the flask by uniting separate streams of the gases in a Y tube. The reaction product was collected on a filter and washed with acetone.

Under similar conditions using ethylene chloride as the reactant virtually no 1,1'-ethylene 2,2'-bipyridylium dichloride was obtained.

*Example 2*

This example illustrates the preparation of 1,1'-ethylene 2,2'-bipyridylium dibromide. The method used was similar to that described in Example 1 with the difference that the solution of the 2,2'-bipyridyl was treated simultaneously with liquid bromine and ethylene gas. The dibromide was precipitated from the reaction mixture as it was formed.

*Example 3*

The process of Example 1 was repeated using propylene in the place of ethylene. During the reaction 1,1'-(1"-methyl)ethylene 2,2'-bipyridylium dichloride formed readily and was precipitated from the solution of unreacted 2,2'-bipyridyl in the nitrobenzene.

*Example 4*

This example illustrates the preparation of 1,1'-(1"-hexyl)ethylene 2,2'-bipyridylium dichloride. Chlorine gas was passed through a mixture of 2,2'-bipyridyl and 1-octene maintained at a temperature of 60° C. The dichloride was precipitated from the reaction mixture and was removed by filtration.

What we claim is:

1. A process of making a 1,1'-alkylene-2,2'-bipyridylium dihalide comprising contacting 2,2'-bipyridyl with a mixture of a halogen and a 1-alkene at a temperature from about ambient temperature to about 211° C.

2. A process according to claim 1 wherein the halogen is chlorine.

3. A process according to claim 1 wherein the alkene contains from 2 to 10 carbon atoms.

4. A process according to claim 3 wherein the alkene is ethylene.

5. A process according to claim 1 wherein the 2,2'-bipyridyl is dissolved in a solvent which is inert to chlorine and in which the 2,2'-bipyridylium dihalide is sparingly soluble.

6. A process according to claim 5 wherein the solvent is a nitrohydrocarbon.

7. A process according to claim 1 wherein a catalyst is present in the reaction mixture.

8. A process according to claim 7 wherein the amount of catalyst present is from 10 to 20% by weight of the amount of 2,2'-bipyridyl.

9. A process of making 1,1'-ethylene-2,2'-bipyridylium dichloride comprising passing ethylene and chlorine into a mixture comprising a catalyst and a solutiton of 2,2'-bipyridyl in a solvent said mixture being heated to a temperature of 80° to 160° C.

10. A process according to claim 9 wherein said catalyst is selected from the group consisting of sodium chloride, glass wool and silica gel and said solvent is nitrobenzene.

No references cited.

WALTER A. MODANCE, *Primary Examiner.*

R. T. BOND, *Assistant Examiner.*